US007422030B2

(12) United States Patent
Stone (10) Patent No.: US 7,422,030 B2
(45) Date of Patent: Sep. 9, 2008

(54) AIR ADMITTANCE VALVE ASSEMBLY

(75) Inventor: Richard T. Stone, Minneapolis, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 362 days.

(21) Appl. No.: 11/182,635

(22) Filed: Jul. 15, 2005

(65) Prior Publication Data

US 2006/0011239 A1      Jan. 19, 2006

Related U.S. Application Data

(60) Provisional application No. 60/588,557, filed on Jul. 15, 2004.

(51) Int. Cl.
*F16K 21/04* (2006.01)
*F16K 15/14* (2006.01)
(52) U.S. Cl. .............. 137/526; 137/533.17; 137/533.27
(58) Field of Classification Search ................. 137/526, 137/511, 533.17, 533.27
See application file for complete search history.

(56) References Cited

U.S. PATENT DOCUMENTS

| 4,535,807 A * | 8/1985 | Ericson ................. 137/533.31 |
| 5,201,685 A * | 4/1993 | Raisanen ..................... 454/259 |
| 6,415,816 B1 | 7/2002 | Beckey et al. |
| 6,532,988 B1 * | 3/2003 | Ericson ................. 137/516.11 |

* cited by examiner

*Primary Examiner*—Stephen M. Hepperle
*Assistant Examiner*—William McCalister
(74) *Attorney, Agent, or Firm*—Anthony G. Eggink; Katrina M. Eggink (57) ABSTRACT

A one directional flow valve assembly for a fluid system. The valve assembly is comprised of a valve body having an internal valve chamber in communication with the ambient environment and a valve seat arrangement. The assembly further has a cap structure with means to position and align a sealing member with respect to the valve seat. A flexible elastomeric sealing diaphragm may be utilized and which is under tension when the sealing diaphragm is in a sealing configuration. The sealing member has a peripheral deflection shield to direct ambient fluid through the valve body. A carrier plate structure may be provided to position the sealing member and deflection shield with respect to the valve seat arrangement to operate the valve assembly.

20 Claims, 6 Drawing Sheets

AIR ADMITTANCE VALVE ASSEMBLY

This application claims the benefit of U.S. Provisional Patent Application Ser. No. 60/588,557, having the filing date of Jul. 15, 2004.

BACKGROUND OF THE INVENTION

This invention relates generally to a one directional flow valve assemblies for fluid systems and particularly to assemblies which more efficiently permit the ambient environment to equalize negative pressure differentials within the fluid system while preventing positive pressure gases from escaping into the ambient environment. The present invention particularly provides improved and efficient airflow characteristics which are for air admittance valve assemblies. These valve assemblies are constructed and arranged to provide an automatic one-way valve structure operative in low pressure differential environments such as in the drain portion of a plumbing system. The valve assemblies of the invention provide responsive and sensitive air inlet valve structures for, but not restricted to, indoor use environments to vent into plumbing systems.

Air admittance valve assemblies are disclosed in Applicant's U.S. Pat. No. 6,415,816 ('816 Patent) and which is incorporated by reference herein. The air admittance valve assemblies disclosed in the '816 Patent utilize tension membranes in cooperation with a singular circular valve seat. The present invention provides new body member structures over those of the '816 Patent which more efficiently permits air inflow, air through flow and air outflow. The valve body member of the invention provides novel inlet and outlet ports and provides a cooperating air deflection member mounted circumferentially about the tension membrane or other sealing member to deflect the airflow moving through the valve approximately 180°, thereby providing a reaction force to completely open the valve at low airflow rates.

The air admittance valve assembly of the present invention provides a valve body structure which improves intake airflow by providing a plurality of radially disposed inlet ports or chutes. The inlet chutes communicate with a centrally disposed valve chamber and are disposed in the valve body to define a plurality of peripherally positioned and circumferentially arranged air outlet chutes. The sealing membrane carrier structure is provided with a peripheral air deflection or wing member which results in the radial movement of airflow from the valve chamber down and through the outlet chute(s).

The improved valve body configuration of the present invention significantly increases airflow rate by decreasing airflow resistance and providing increased inflow and outflow areas. Firstly, the circumferential airflow component of velocity is minimized by the novel body design. Secondly, directed inflow patterns are provided by upwardly angled inlet ports. Thirdly, an air deflector shield is placed around the sealing membrane providing increased seal opening at each flow rate of air compared to structures not incorporating an air deflector shield.

The first feature of reducing the circumferential airflow component reduces the Coanda effect of the air flowing across the bottom of the sealing membrane. This reduces the suction on the bottom of the sealing membrane permitting increased seal openings at any differential pressure. The second feature of upwardly angled inlet ports reduces the amount of angular deflection that the air stream must undergo. This reduces the pressure drop at any given airflow rate. The third feature of an air deflection shield generates a reaction force from the near 180 degree turn that the air stream makes when impinging upon the sealing member. This reaction force assists in opening the valve. Air admittance valves incorporating these three new features exhibit dramatically improved air flow rates for any given sized device without any compromise to sealing.

It is the advantage of the present invention providing an automatic air admittance valve which effectively and reliably allows ambient make up air under ambient pressure to enter and equalize a negative pressure differential in a plumbing drain and waste system while preventing the discharge of contaminated and undesirable gasses under zero or positive pressure conditions. It is further the object of the present invention to provide a flexible sealing diaphragm for a gravity controlled low pressure air admittance valve assembly which is reliable and effective for venting into such plumbing systems. It is still a further object of the invention to provide a valve body structure which efficiently moves and directs air into, through and out of the valve body.

SUMMARY OF THE INVENTION

The present invention provides an automatic, one-way air admittance valve assembly for low pressure venting into a closed system, such as a plumbing drain and waste system.

The air admittance valve is comprised of a valve body having an internally positioned valve chamber which is constructed and arranged to form an annular valve seat. The annular valve seat of the valve body has a sealing edge with a predetermined sloping configuration. A valve cap is provided for attachment to the valve body. The valve body has a plurality of laterally disposed and circumferentially spaced air inlet ports in communication with the valve chamber. The inlet ports are preferably sloped upwardly, i.e., 0-30 degrees from horizontal. A plurality of peripheral outlet areas are provided for communication with the closed system and which are circumferentially spaced and positioned between the valve chamber and the valve body interior. A carrier structure with an elastomeric flexible sealing membrane and an air deflection shield is provided for flexibly sealing against the sealing surface of the annular valve seat. The air deflection shield is peripherally mounted to the sealing membrane and is positioned above the valve seat when operational and which directs air from the valve chamber to the peripherally positioned air outlet chutes.

The flexible elastomeric sealing member may be a tensioned membrane preferably mounted to the air deflection member of the carrier structure. The valve cap of the assembly further has means to guide the carrier structure to thereby position and place the sealing diaphragm or deflection member onto the sealing surface of the annular valve seat. The carrier plate structure is provided for guiding the elastomeric diaphragm and for sealing the flexible diaphragm against the valve seat. The carrier structure may have an annular body configuration for attachment to the diaphragm and which may incorporate the deflection shield. The carrier structure further may have a plurality of radiating structural ribs which extend upward from the air deflection shield to the center hub.

Further provided are valve body configurations and, particularly, valve seat and cooperating flexible sealing diaphragm configurations which repeatedly seal at zero or positive pressure conditions so as to permit an air admittance valve to function in a low pressure plumbing environment.

It is an object of the invention to provide air admittance valve assemblies which are responsive at low pressures to comply with various plumbing codes and regulatory agencies.

It is a particular advantage of the present invention to provide a valve body structure which efficiently and effectively allows radial air inflow from the periphery of the valve body and which provides valve body elements that contribute to efficient airflow through and out of the valve body.

These and other benefits of this invention will become clear from the following description by reference to the drawings.

DESCRIPTION OF THE PREFERRED EMBODIMENTS

Figure 1:
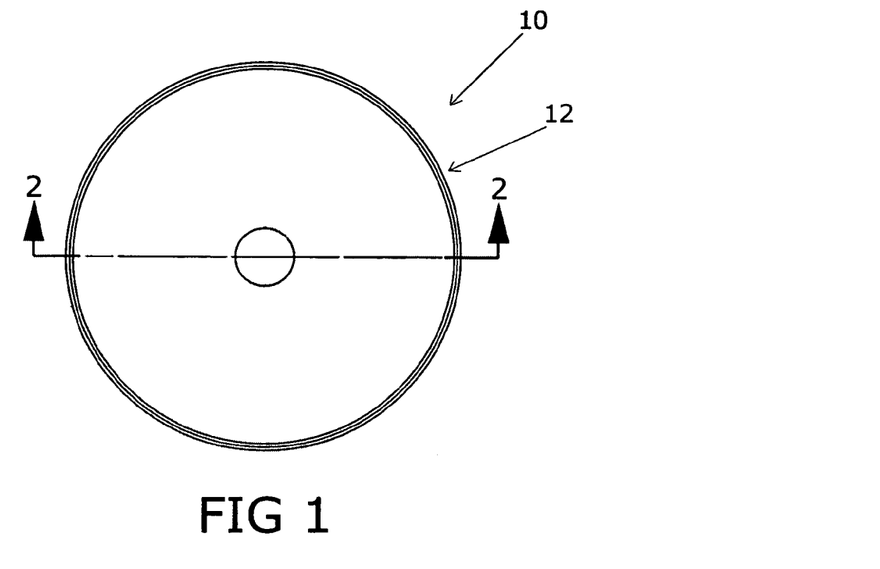
FIG. 1 is a top plan view of the air admittance valve assembly of the present invention.
Figure 2:
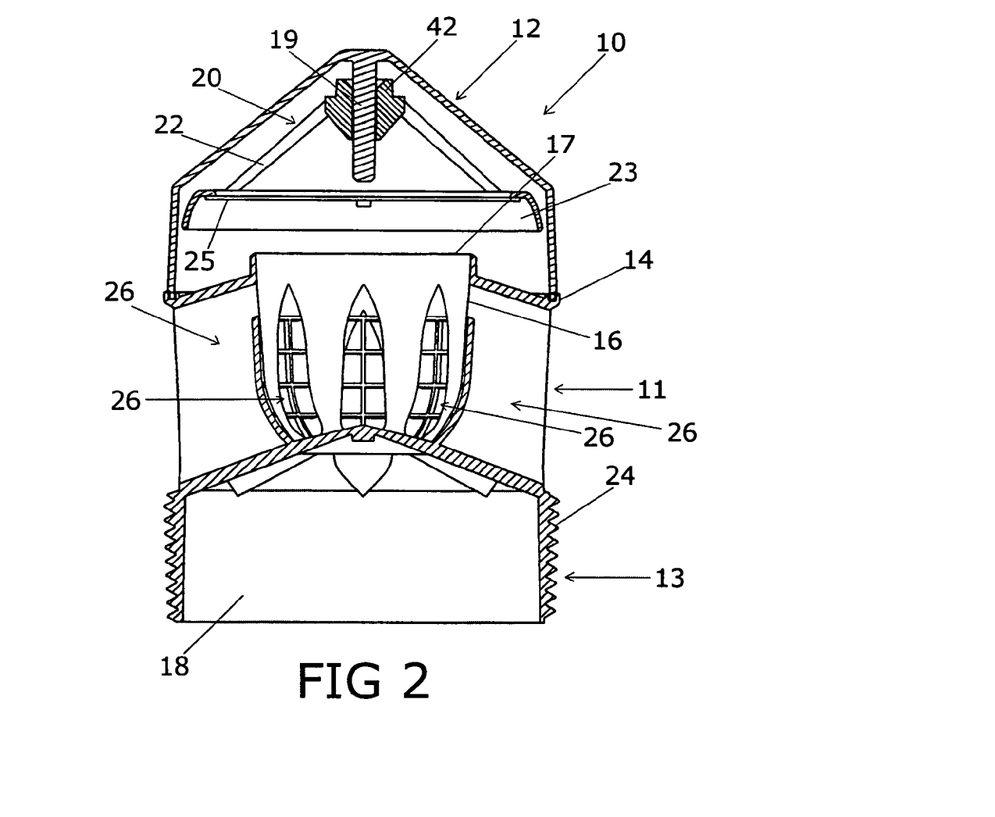
FIG. 2 is a sectional view of the valve assembly taken along line 2-2 of FIG. 1.
Figure 3:
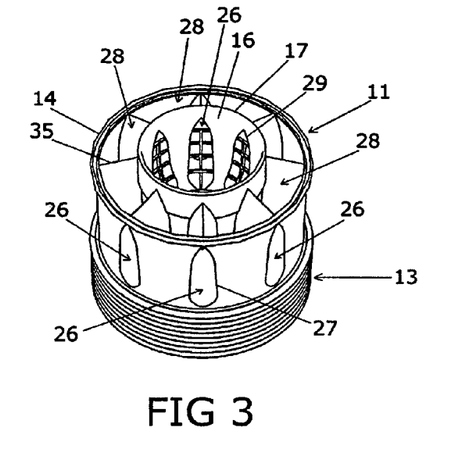
FIG. 3 is a perspective view taken from the top and side of the valve body of the air admittance valve assembly.
Figure 4:
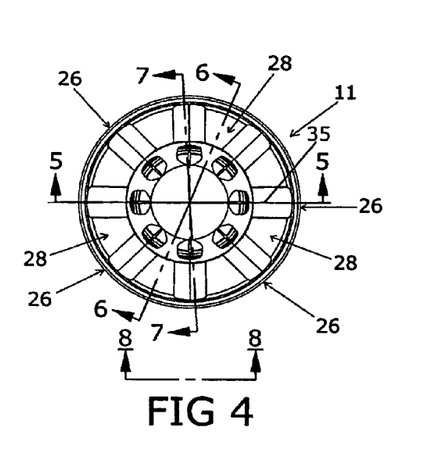
FIG. 4 is a top view of the valve body of the air admittance valve assembly.
Figure 5:
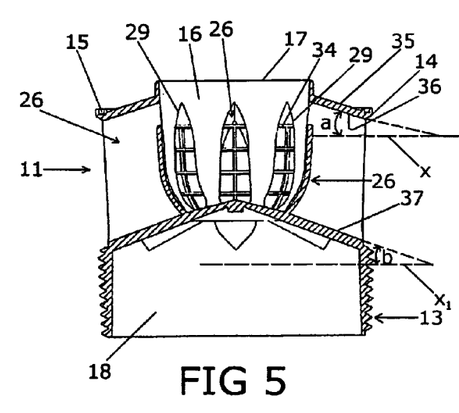
FIG. 5 is a sectional view taken along line 5-5 of FIG. 4.
Figure 6:
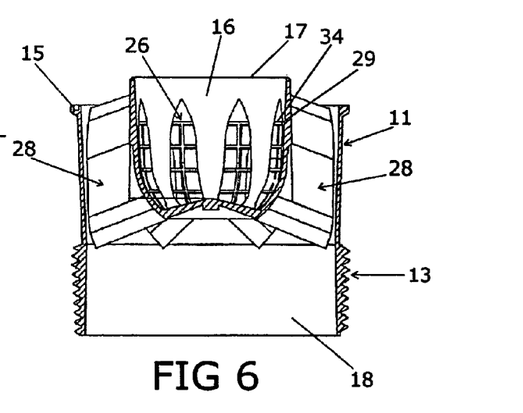
FIG. 6 is a sectional view along line 6-6 of FIG. 4.
Figure 7:
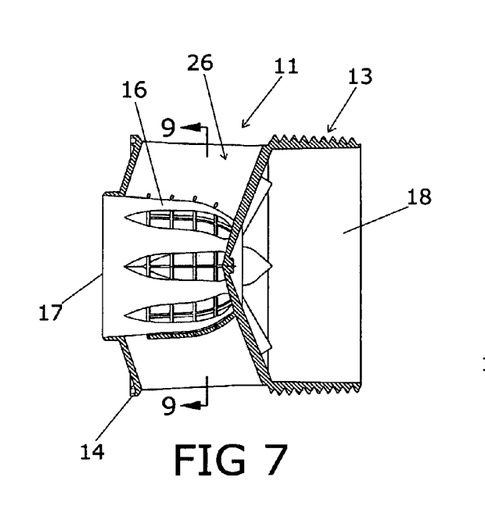
FIG. 7 is a sectional view along line 7-7 of FIG. 4.
Figure 8:
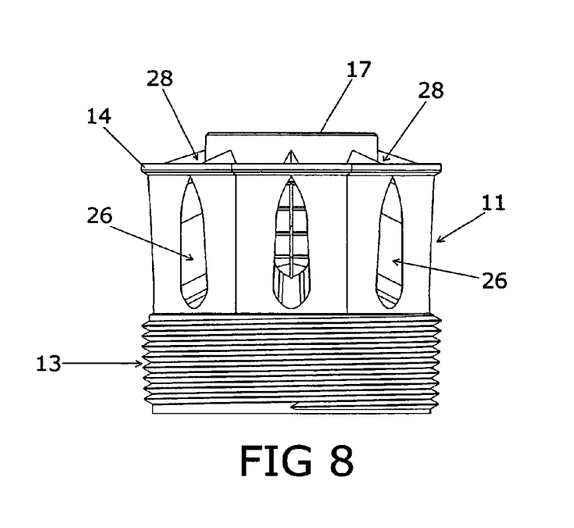
FIG. 8 is a sectional view along line 8-8 of FIG. 4.
Figure 9:
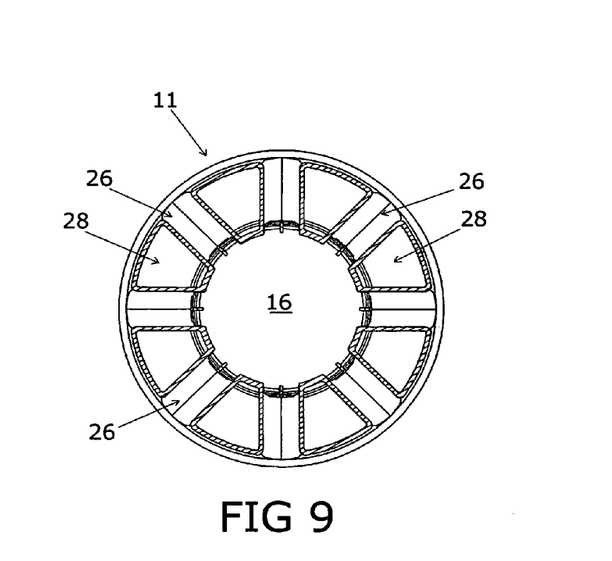
FIG. 9 is a sectional view along line 9-9 of FIG. 7.

Referring to FIGS. 1 and 2, a one-way valve assembly 10 is shown comprising a valve body 11 and a cap member 12 mounted thereon. The valve body 11 has a bottom connecting portion 13 which by means of pipe threads 24, for example, may be connected to a closed system, such as a plumbing system. The valve assembly 10 is constructed and arranged for connection to the vent portion of a drain-waste-vent (DWV) plumbing system to permit ambient air to enter the system during negative pressure or vacuum conditions and to seal the drainage system during positive pressure conditions to thereby prevent gases from entering the ambient environment. The valve assembly 10 may also be utilized in other closed systems requiring one-way venting from the ambient environment under low differential pressures, i.e., in the order of 0.3 inches of water pressure or 0.01 psi.

Referring further to FIGS. 3-6 the valve body member 11 of the one-way valve assembly 10 is further shown to comprise a valve chamber 16 centrally disposed within the upper portion of the valve body member 11. A plurality of air inlet chutes 26 are shown extending from the valve body 11 exterior to the valve chamber 16. The valve chamber 16 is shown to comprise a hemispherical or cupped wall terminating in an upwardly extending valve seat 17. The valve chamber 16 has a cone shape or sloped bottom portion for condensation drainage. The sloped chamber body is shown aligned with the angled air inlet chutes 26. A plurality of air outlet areas 28 are peripherally positioned between each air inlet chute 26 and between the valve chamber 16 and lateral outer wall of the valve body 11. The top of each inlet chute is shown to have a top edge 35 which aids in directing airflow through the outlet areas 28. The upper portion of the valve body 11 has an upper peripheral portion 14 having a terminal connecting ridge 15 for receiving the bottom portion of the cap member 12. The threaded lower outer portion 13 is provided to permit the valve assembly 10 to be secured to an internally threaded conduit or pipe, for example, or to an adapter structure connected to the top of a vent pipe. The pipe threads are preferably NPT threads (National Pipe Threads). Although threads 24 are shown, alternative connecting means of the valve assembly 10 may be utilized, i.e., the use of adhesives or other connecting means.

Referring to FIGS. 10-14, the cap member 12 has alignment means to position the flexible sealing membrane 25 with respect to valve seat 17. A centrally disposed guide member 19 is shown extending from the interior of the cap member 12. A sliding carrier structure 20 is shown positioned about the axially aligned guide member 19. The carrier structure 20 is comprised of a central hub 42 having a bore for sliding with respect to guide member 19. A plurality of structural ribs 22 are shown extending from the hub 42 and to the top of the circumferential air deflection shield 23. Referring to FIG. 2, the thin flexible elastomeric membrane 25 is shown fixed to the bottom of the deflection shield 23 of the sliding carrier structure 20 and in a constrained state and is tensioned while sealing. The sealing membrane 25 when sealingly positioned over the circumferential valve seat 17 of the valve chamber 16 seals and maintains system gases within the valve body and bottom valve body area 18.

In operation, the air admittance valve assembly 10 when under negative pressure in the valve body due to negative system pressure through valve area 18, the sealing membrane carrier structure 20 is lifted upward from valve seat 17 thereby permitting ambient air to enter the valve chamber 16 through air inlet areas 26. The inlet air enters the closed system through valve outlet portion 18 to thereby equalize the pressure differential between the closed system and the ambient environment.

Figure 10:
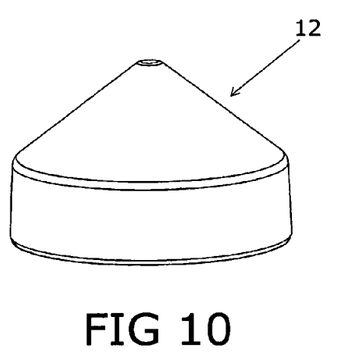
FIG. 10 is a lateral view of the cap member of the air admittance valve assembly of FIG. 1.
Figure 11:
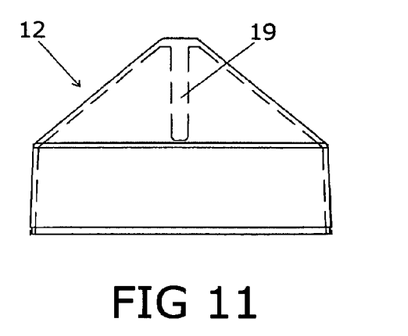
FIG. 11 is a lateral view of the cap member of the air admittance valve assembly.
Figure 12:
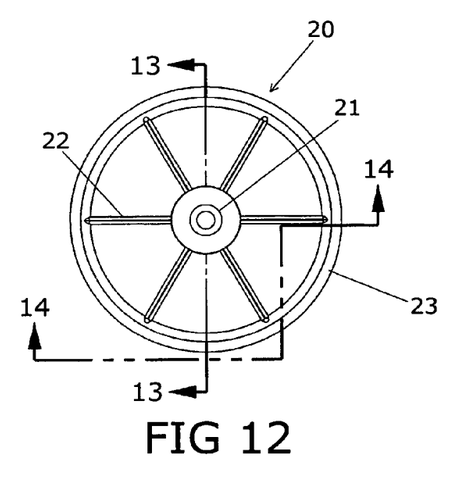
FIG. 12 is a top view of the carrier structure of the air admittance valve assembly.
Figure 13:
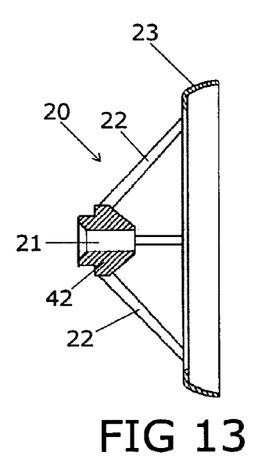
FIG. 13 is a lateral sectional view of the carrier structure taken along line 13-13 of FIG. 12.
Figure 14:
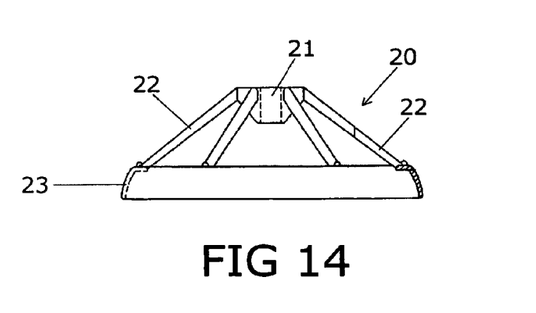
FIG. 14 is a sectional view of the carrier structure taken along line 14-14 of FIG. 12.
Figure 15:
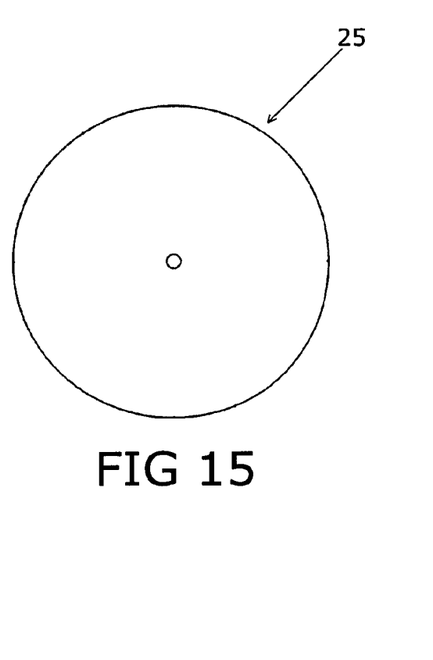
FIG. 15 is a top view of the sealing membrane of the air admittance valve.
Figure 16:
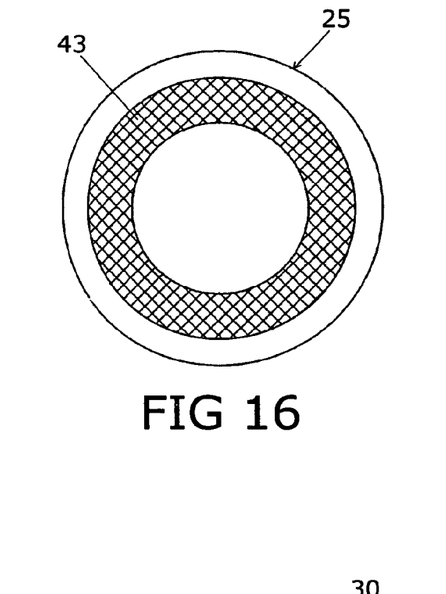
FIG. 16 is a bottom view of the sealing membrane of FIG. 15.
Figure 17:
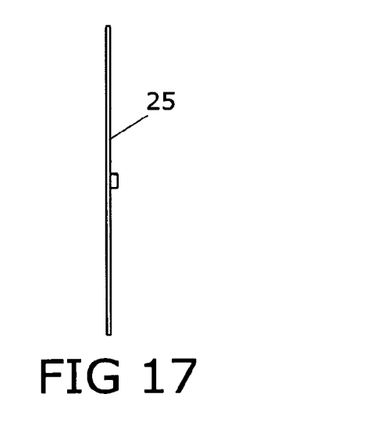
FIG. 17 is a lateral view of the sealing membrane of FIG. 15.

The valve assembly 10 operation described above is provided by the structural configuration of the valve body 11, in cooperation with the cap member 12 shown in FIGS. 10 and 11, the carrier assembly 20 with the peripheral airflow directional control element 23 shown in FIGS. 12-14 and the sealing membrane 25 shown in FIGS. 15-17.

Referring to FIGS. 3-9, the valve body member 11 is shown comprised of a tubular structure having an upper portion with a peripheral portion 14 having a ridge 15 for connection with the cap member 12. The cup shaped or hemispherical valve chamber 16 is shown positioned centrally in the valve body 11 and having the valve seat 17 extending upwardly therefrom.

The valve chamber 16 is shown comprising a wall having a plurality of inlet areas 29 (i.e., eight) each having screen or web-like portions 34. The inlet ports may be angled upwardly into the valve body, i.e., ranging up to 30° as shown by angles "a" and "b" with respect to horizontal planes x and $x_1$, respectively in FIG. 5. Thus, the inner top portion 36 and inner bottom portion 37 of the air inlet 26 are shown to be angled at angles "a" and "b" which are shown to be generally parallel. The apertured wall portions of the valve chamber 16 are shown to have a generally curvilinear geometric or cathedral-window-like configuration which as shown in FIGS. 2-9 and 19 comprise vertically elongated openings having upwardly angled rounded bottom portions and upwardly angled tapered top portions. The cathedral-window-like cross sectional inlet chutes 26 provide an efficient valve geometry and provide cooperating circumferential outlet areas. The number of inlet and outlet chutes, however, may be varied. The webbed apertured wall portions are provided to keep debris and insects from entering the interior of the valve chamber 16 and to thereby secure the integrity of the sealing function of the sealing membrane on the valve seat 17. The upper peripheral portion 14 includes outwardly extending inlet port or channel structures which connect the valve chamber 16 and define the opposing air outlet areas or ports 28. The latter outlet chambers 28 are in communication with the bottom outlet portion 18 of the valve body 11.

In FIGS. 10 and 11, the cap member 12 is shown comprised of a circular, unitary structure having a curvilinear downwardly sloping cross section. Centrally disposed is a downwardly extending guide member 19. The unitary cap structure 12 is preferably molded of a plastic composition, such as PVC or the like, and has a lower end for connection to the valve body member 11. Alternatively, the cap member 12 is provided as a clear molded plastic structure so that one is able to see the inner workings of the device so that users may see the parts and operation of the device.

In FIGS. 12-14, the carrier structure 20 is shown comprised of a central hub 42 having a guide bore 21 for slidably engaging the guide member 19 of cap member 21. Extending angularly and downwardly from the central hub 42 are a plurality of equidistantly spaced structural ribs 22. An annular support ring 23 is shown connected to the bottom of the structural ribs 22 and which is constructed to hold the sealing membrane thereto. As discussed above, the support ring may be formed into a deflection shield 23 to direct airflow through the valve. The carrier structure 20 is also preferably molded of a unitary plastic composition such as PVC or the like.

In FIGS. 15-17 the sealing membrane 25 is shown comprised of a thin circular structure. The sealing membrane 25 is preferably constructed of an elastomeric material which is fixed in a constrained state to the support ring or deflection shield 23 of the carrier structure 20. For example, the sealing membrane 25 may be adhesively fixed at its peripheral edge or otherwise mechanically attached by means, for example, of a formed lip to the support ring 23. The sealing membrane 25 and support ring 23 have a diameter intermediate the diameters of the valve seat 17 and the bottom of the cap member 12. This arrangement permits the support ring 23 to exert the weight of the carrier structure 20 to the sealing membrane 25 concentrically outside of the valve seat 17 to thereby flex the sealing membrane 25 about the valve seat 17. As shown in FIG. 2, the valve seat 17 in cross section is shown to have a sealing edge formed of a rounded edge and an angled wall edge which provides a relief area for the tensioned sealing membrane when in the sealing position. Thus, the thin elastomeric sealing membrane 25 is able to reliably seal against the valve seat 17 in a flexed condition. The sealing membrane 25 is preferably constructed of a flexible elastomeric material, such as Neoprene® (polychloroprene) rubber or the like.

Figure 18:
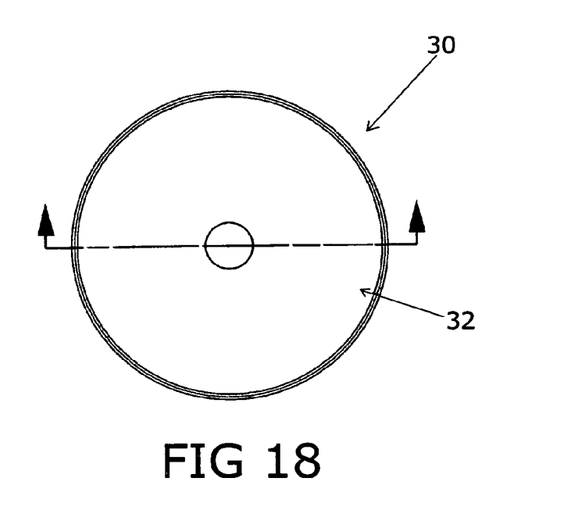
FIG. 18 is a top plan view of another air admittance valve assembly embodiment of the invention.
Figure 19:
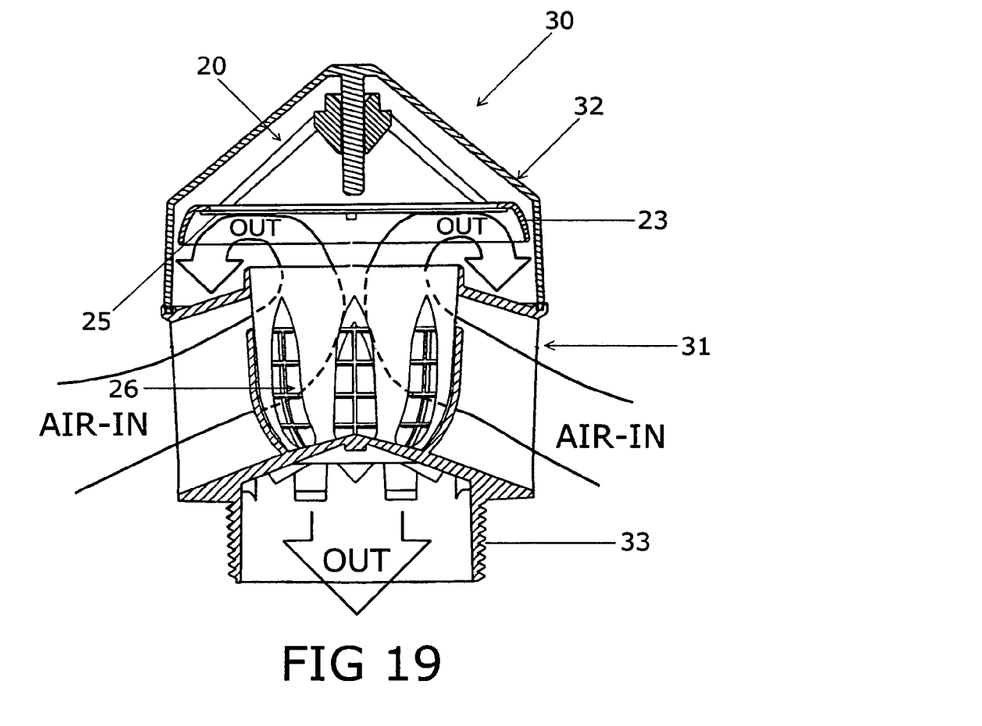
FIG. 19 is a sectional view taken along line 19-19 of FIG. 18.

FIGS. 18 and 19 show another embodiment of the air admittance valve assembly invention. The valve assembly 30 is shown to have a valve body 31 and cap member 32. The valve assembly 30 is similar to and functions the same as the valve assembly 10 described below except that the bottom connection portion 33 is smaller in diameter. FIG. 19, via arrows, shows the airflow in, through and out of the valve body 31. The valve assembly 10 is a three inch valve structure whereas the valve assembly 30 is constructed and arranged to be connected to a two inch conduit for example. The upper body has the same diameter, i.e., 3.5 inches, which permits the valve assembly to be mounted within standard size wall structures. The valve body, valve cap, and slide structure may be molded of a PVC or like polymeric material.

Other valve assembly dimensions, valve attachment means material and other compositions used in the valve assembly are within the purview of this invention. Further, various elements of this invention may be incorporated into air admittance valve structures. For example, the air deflection member mounted peripherally with respect to the valve seat sealing member may be utilized in other valve body structures to direct air flow through the valve and to, thereby, improve air admittance valve performance. The air deflection member may be utilized with other valve seat arrangements and other valve body air flow patterns. The air deflection member may be peripherally mounted and downwardly extending, having a straight or curved cross-sectional configuration.

Figure 20:
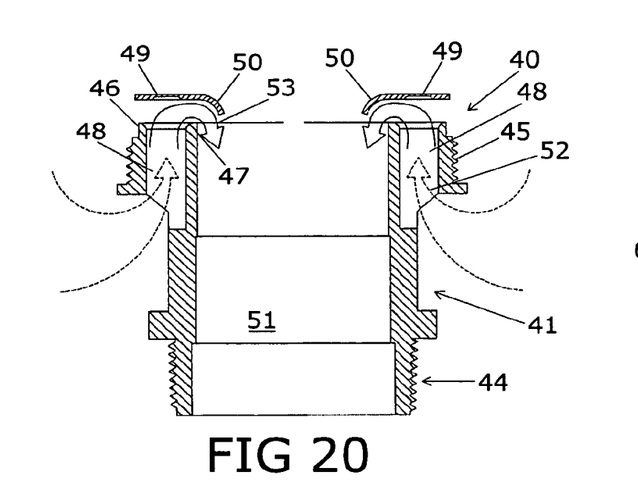
FIG. 20 is a sectional view of an air admittance valve assembly body and showing another embodiment of a sealing member having the air deflection structure of the invention.

As shown in FIG. 20, the valve body structure of another air admittance valve embodiment 40 is shown. In embodiment 40 the valve body 41 has a configuration where the inflow of air, as designated by arrow 52, is provided on the peripheral outside of the valve body, as designated by the annular inlet 48. The valve body member 41 further is shown having a threaded bottom connecting portion 44 and an upper connecting portion 45 for a cap member, not shown. The valve body member 41 has upwardly extending valve seats, namely, outer peripheral valve seat 46 and inner peripheral valve seat 47, to define annular inlet 48. A sealing member 49 is shown aligned with and positioned above the valve seats 46 and 47 to permit air flow to enter the valve body and to exit through valve outlet 51 as shown by arrow 53. Importantly, the sealing member 49 is shown to have a circumferential curved inner wing or air deflection member 50 which directs air flow from the annular inlet 48 and into the valve body 51 for providing air into the closed system to which the air admittance valve is attached. The air deflection member 50 is shown to have a curved cross-sectional configuration, which functions similarly to the air deflection member 23 discussed above. Thus, as the sealing member 49 responds to negative pressure conditions by moving upward from the annular valve seats 46 and 47 inlet air is directed by means of air deflection member 50 into the outlet portion 51 of valve body 41.

Figure 21:
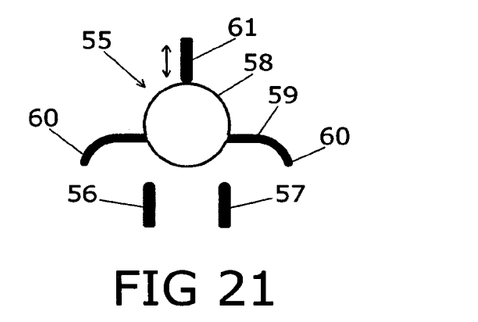
FIG. 21 is a diagrammatic view showing the use of the air deflection structure in another air admittance valve.

The air deflection member of the invention may also be used with other sealing members. As shown in FIG. 21, a valve structure 55 having valve seats 56 and 57 may use a ball-type valve 58 having an air deflection member 59 extending downwardly therefrom. The air deflection member may have a pin-type guide 61 which may cooperate with an internal bore of the valve cap to direct the up and down movement of the round valve body 58. The deflection member 59 extends outwardly and downwardly from the periphery of the valve body 58. The deflection member may be slanted in cross-section or may have a curved cross-section 60, as shown in FIG. 21.

As many changes are possible to the embodiments of this invention utilizing the teachings thereof, the descriptions above and the accompanying drawings should be interpreted in the illustrative and not in the limited sense.

That which is claimed is:

1. A one-way valve assembly for preventing the escape of gases from a system while permitting the venting of ambient air into the closed system under vacuum conditions, said valve assembly comprising:
   a) a valve body having an upper portion and a bottom portion for connection to and communication with the closed system, said upper portion having a plurality of radially positioned air inlet portions of a specified configuration communicating with the ambient environment, said radially positioned air inlet portions comprising vertically elongated openings having upwardly angled rounded bottom portions and upwardly angled tapered top portions for directing incoming air, said upwardly angled bottom and top portions each having an angle ranging up to 30 degrees with respect to a horizontal plane, each said inlet opening further having a webbed structure extending across said vertically elongated inlet opening;
   b) a valve chamber positioned within said upper portion of said valve body, said valve chamber having a wall with openings communicating with each of said plurality of air inlet portions and said wall further having an upwardly extending valve seat and forming peripheral valve outlet portions between said valve seat and said valve body upper portion, said valve outlet portions being in communication with said valve body bottom portion;
   c) a vertically movable carrier structure having a flexible sealing member adapted for sealing said valve seat of said valve chamber, said carrier structure having a rigid peripheral air deflection member with a generally curved cross-sectional configuration for directing airflow into said valve outlet portions, said air deflection member having an inner periphery and said sealing member being mounted to said rigid inner periphery of said air deflection member; and
   d) a cap structure connected to said upper portion of said valve body, said cap structure having alignment means for said carrier structure for positioning said flexible sealing member for movement with respect to said valve seat of said valve chamber, whereby the cooperation of said radially positioned air inlet portions having said vertically elongated openings with upwardly angled bottom and top portions and said curved rigid peripheral air deflection member allows for increased incoming airflow velocity and a decreased airflow resistance to provide an efficient and responsive valve assembly.

2. The valve assembly of claim 1, wherein the valve chamber further has a cone shaped bottom portion for condensation drainage and wherein said cone shaped bottom portion of said valve chamber is aligned and contiguous with said sloped bottom portions of said air inlet ports.

3. The valve assembly of claim 1 wherein said valve body and said valve chamber are molded of a unitary structure comprised of a plastic composition, wherein said cap structure is molded of a unitary plastic composition and wherein said flexible sealing member is a flexible sealing membrane and is formed of a thin elastomeric material.

4. The valve assembly of claim 1 wherein said carrier structure is a slidable carrier member having an annular support portion, said air deflection member being attached to said annular support structure of said slidable carrier member and wherein said cap structure has an alignment post for engaging said slidable carrier member.

5. An air admittance valve for a low pressure venting into a plumbing drain and waste system comprising:
   a) a valve body having a centrally disposed air inlet chamber in communication with the ambient environment, said air inlet chamber having a wall with an upwardly extending peripheral wall edge forming a valve seat;
   b) a flexible sealing member having a rigid peripheral airflow deflection member and attached guiding member, said rigid peripheral airflow deflection member having a generally curved cross-sectional configuration with an internal bottom periphery, said flexible sealing member being constructed and arranged for sealing against said valve seat, said rigid air deflection member extending downwardly from said guiding member for directing ambient airflow from said inlet chamber and through said valve body, said flexible sealing member being attached to said internal bottom periphery of said peripheral airflow deflection; and
   c) wherein said guiding member guides said sealing member with respect to said valve seat in said valve body, wherein said guiding member is comprised of a vertically movable carrier structure having an annular peripheral ridge and wherein said sealing member and said air deflection member are attached to said peripheral ridge.

6. The air admittance valve of claim 5, wherein said carrier structure further comprises an axial hub and a plurality of structural ribs extending from said axial hub and said annular peripheral ridge being fixed to said structural ribs.

7. The air admittance valve of claim 6, wherein said valve seat has a circular configuration having a first diameter and said sealing member is circular and has a second diameter and wherein said second diameter is greater than said first diameter and wherein said sealing member is a sealing membrane having a thin, uniform thickness and further wherein said sealing membrane is fixed to said carrier structure in a constrained state and being constructed and arranged to flexibly seal.

8. The air admittance valve of claim 5, wherein said means to guide said sealing member further comprises a guide post member positioned axially in said valve body.

9. In an air admittance valve for connection to a plumbing system having a valve body with a plurality of peripheral air inlets, a valve structure comprising:
   a) at least one circular valve seat defining a termination of the air inlet in said valve body, said valve seat further comprising a sealing surface having a predetermined configuration;
   b) a vertically movable carrier structure having an axial, centrally disposed guide means and a downwardly disposed rigid air deflection shield having a curved cross-sectional configuration and an adjacent interior peripheral surface;
   c) a generally circular and flexible sealing member having a peripheral edge portion, said peripheral edge portion of said sealing member being attached to said interior peripheral surface of said rigid air deflection shield of said carrier structure;
   d) each said peripheral air inlet having an upwardly angled inlet port structure having an upwardly angled rounded bottom portion and an upwardly angled tapered top portion for directing incoming air into a valve chamber, and wherein said upwardly angled bottom and top portions of each said angled inlet port has a slope ranging up to 30 degrees with respect to a horizontal plane; and e) said valve structure being constructed and arranged whereby upon a negative pressure differential air is admitted to the valve body through said circular valve seat by the movement of said sealing membrane from said valve seat and whereby upon a pressure differential of zero or above said sealing member seals said sealing surface of said valve seat to thereby seal a plumbing system.

10. The valve structure of claim 9, wherein said valve seat has an angled configuration.

11. The valve structure of claim 9, wherein said carrier structure includes a plurality of structural rib members extending from said centrally disposed guide means to said air deflection shield.

12. The valve structure of claim 9, wherein said valve body includes a cap structure having an axially aligned post member extending downwardly therefrom for guiding said carrier structure.

13. The valve assembly of claim 1, wherein said valve outlet portions are peripherally positioned between said valve inlet portions in said upper portion of said valve body.

14. The valve assembly of claim 13, wherein each said valve inlet portion has a top edge extending between said valve chamber and said valve body upper portion, each said top edge being provided to direct airflow through said valve outlet portions.

15. The air admittance valve of claim 5, wherein said air inlet chamber has a cone-shaped bottom portion for condensation drainage.

16. The air admittance valve of claim 5, wherein said valve body has a plurality of radially positioned air inlet chutes in communication with said air inlet chamber.

17. The air admittance valve of claim 16, wherein each said radially positioned air inlet chute comprises a vertically elongated opening.

18. The air admittance valve of claim 17, wherein each said elongated opening has an upwardly angled rounded bottom portion and an upwardly angled tapered top portion.

19. The air admittance valve of claim 18, wherein each said upwardly angled rounded bottom portion and each said upwardly angled tapered top portion has an angle ranging up to 30° with respect to a horizontal plane.

20. The air admittance valve of claim 5, wherein said valve body has a plurality of air inlet ports, each said air inlet port comprising a cathedral shaped opening having a generally parallel upwardly sloped bottom and top portions and having a webbed structure within each said inlet port opening.

* * * * *